Jan. 25, 1966
M. FELCHECK
3,231,786
MULTIPLE RELAY DRIVER
Filed March 21, 1962
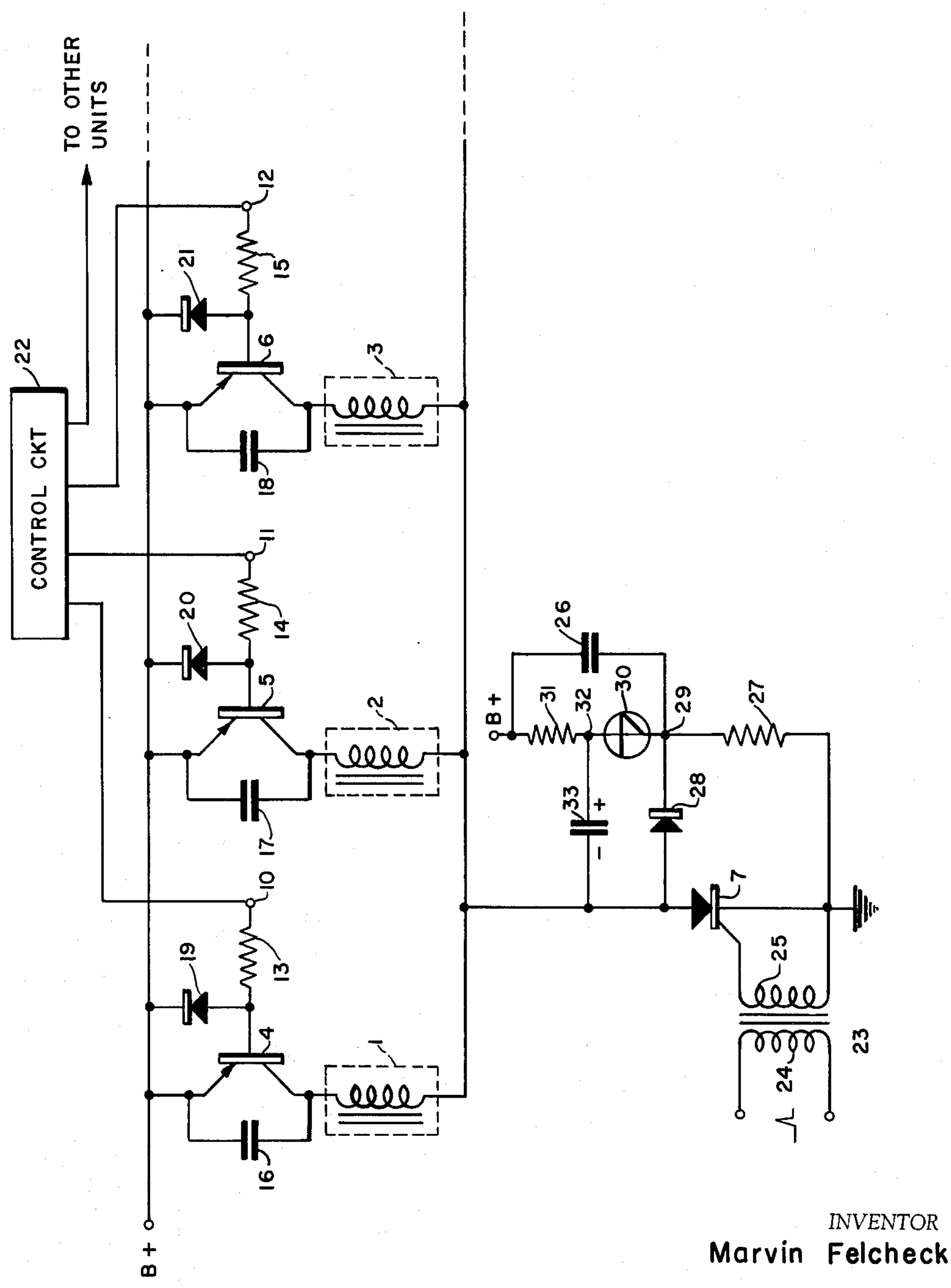
INVENTOR
Marvin Felcheck
BY [signature]
ATTORNEY United States Patent Office 3,231,786

Patented Jan. 25, 1966

3,231,786
MULTIPLE RELAY DRIVER

Marvin Felcheck, Bayside, N.Y., assignor to American Machine & Foundry Company, a corporation of New Jersey Filed Mar. 21, 1962, Ser. No. 181,336
6 Claims. (Cl. 317—148.5)

This invention relates to switching circuits, and while not limited thereto, relates to switching circuits particularly adaptable for providing pulse energization to inductive loads, and to driving circuits for multiple loads of the highly inductive type. This case includes subject matter described and claimed in application Serial No. 181,337, filed March 21, 1962, by William J. Mahoney.

When a supply potential to an inductive device is abruptly interrupted, the magnetic field developed by the device collapses and generates a high inverse voltage known as the inductive kick. This inverse voltage can be many times greater than the original supply voltage and therefore is a problem which must be reckoned with when designing switching circuits for inductive devices. A common solution to the problem is to effectively remove the inverse voltage from the load by connecting a shunting diode across the inductive load. However, there are many installations, such as with high speed stepping relays, where removal of the inverse voltage has undesirable effects.

If the high inverse voltage cannot be removed, it is then necessary to construct the switching circuit to withstand the inverse voltage. Transistors are not well suited for this function, since they have a relatively low inverse voltage rating and, if used, must be specially constructed and usually must have a much higher capacity than would otherwise be required. Controlled rectifiers, on the other hand, normally have a high inverse voltage rating and are generally well suited, but are relatively expensive, particularly when a large number of inductive devices are being controlled.

An object of this invention is to provide an economic switching circuit for controlling current flow in inductive devices.

Another object is to provide an economic circuit to supply pulse energization to a plurality of inductive load devices.

Still another object is to provide a switching circuit which combines transistors and a controlled rectifier to obtain a relatively low cost switching circuit having high inverse voltage characteristics.

In essence, the unique switching circuit in accordance with this invention includes a transistor and a controlled rectifier connected in series with the inductive load. Because of the transistor's low inverse voltage rating, it cannot be used to effectively interrupt current flow, but is used instead to condition the inductive load for energization. The controlled rectifier is part of a pulse forming circuit, such as a monostable multivibrator, such that the controlled rectifier is rendered conductive for a predetermined time interval in response to a trigger pulse. It is the controlled rectifier which initiates and terminates current flow through the inductive load, and therefore only the controlled rectifier must be capable of withstanding the high inverse voltage generated by the inductive load.

This circuit arrangement is particularly advantageous when a large number of inductive load devices are being energized. Each of the separate loads is provided with a transistor which is employed as a steering or distributing element, when conditioning the associated load for energization. A single controlled rectifier then controls the supply of the energizing pulses to all loads simultaneously, but only those loads which have been conditioned for energization by the associated transistor are affected. Obviously, a switching system of this type has general utility and is not limited to inductive load devices.

In order that the manner in which these and other objects are attained in accordance with the invention can be understood in detail, reference is had to the accompanying drawing, which forms a part of this specification, which shows a schematic diagram of a switching system in accordance with this invention.

A purpose of this invention is to provide selective energization for the inductive loads 1, 2 and 3 each of which could, for example, be the energizing winding for a high speed stepping relay. Transistors 4, 5 and 6 have their collector-emitter circuits connected in series respectively with inductive loads 1, 2 and 3, and when conductive, condition the associated load device for energization. Controlled rectifier 7 is part of a monostable multivibrator circuit and controls pulse energization to the conditioned load devices.

Transistors 4–6 are of the PNP type having the base elements thereof connected to terminals 10–12 via resistances 13–15, respectively. The emitter elements of these transistors are connected to a positive source of potential and the collector elements are connected respectively to one end of the inductive loads 1–3.

Whenever a negative potential is applied to terminal 10, i.e., a potential negative with respect to the emitter of transistor 4, the transistor becomes conductive and therefore current can flow through the collector-emitter circuit and through the load device. Under these circumstances, the associated load device 1 is referred to as conditioned for energization. Similarly, when negative potentials are applied to terminals 11 and 12, the respective transistors 5 and 6 become conductive, conditioning load devices 2 and 3 for energization.

Capacitor 16 is connected between the emitter and collector of transistor 4, and diode 19 is connected between the base and emitter of this transistor. These elements are added to provide transient suppression. Similarly, capacitors 17 and 18 are connected between the emitter and collector of transistors 5 and 6, and diodes 20 and 21 are connected between the base and emitter thereof, respectively.

A control circuit 22 is connected to terminals 10, 11 and 12 to selectively provide negative potential thereto. Normally, the control signals provided are of the D.C. type (as opposed to short pulse control signals), as can be provided by conventional bi-stable circuits. The actual configuration of the control circuit would vary in accordance with the contemplated use and can, for example, include a ring counter, shift register or one or more flip-flop circuits. In some instances, it may be desirable to interlock the control circuit 22 with the controlled rectifier 7 so that transistors 4–6 cannot change conductive states when the controlled rectifier is conductive.

It should be noted that as many additional load devices with associated transistors as desired can be connected in the same manner as load devices 1–3 and associated transistors 4–6.

The anode of controlled rectifier 7 is connected to the other end of each of the load devices 1–3, and the cathode thereof is connected to ground. Input pulses are applied to primary winding 24 of transformer 23 having a secondary winding 25 connected between the gate element of controlled rectifier 7 and the ground. When a trigger pulse applied to primary winding 24 makes the gate element of controlled rectifier positive, the controlled rectifier breaks down and conducts current from the anode to the cathode. Thereafter, the controlled rectifier remains conductive even through the gate potential is removed. Such a controlled rectifier can subsequently be turned off, or commutated, by momentarily making the anode negative with respect to the cathode. Presently available controlled rectifiers are in the class of PNPN silicon semiconductors and have high inverse voltage ratings.

The commutating circuit for controlled rectifier 7 includes a charging circuit formed by capacitor 26 connected in series with resistance 27 between a positive source of potential and ground. A diode 28 is connected between junction 29 between resistance 27 and capacitor 26 and the anode of controlled rectifier 7, the cathode of the diode being connected to junction 29. When the controlled rectifier is not conducting, diode 28 clamps junction 29 at a positive potential and effectively prevents charging of capacitor 26. However, when controlled rectifier 7 is rendered conductive, diode 28 is back biased, having no further effect on the potential at junction 29. Accordingly, capacitor 26 begins charging when controlled rectifier 7 is rendered conductive.

A four-layer diode 30 is connected in series with a resistance 31 across capacitor 24. A four-layer diode is a PNPN semi-conductor device demonstrating a high impedance to current flow in either direction. The diode breaks down and conducts in a forward direction when the potential applied across the diode exceeds a predetermined breakdown potential. The high impedance state can subsequently be restored by reducing the current flow through the diode below a predetermined holding level. The four-layer diode 30 permits capacitor 26 to charge until diode breakdown voltage is obtained, at which time the four-layer diode is rendered conductive, discharging the capacitor through the resistance 31. The breakdown of the four-layer diode will always occur a predetermined time interval after capacitor 26 begins charging.

When controlled rectifier 7 is conductive, one plate of capacitor 33 is effectively connected to ground, and the other plate is connected to the positive source of potential through resistance 31, assuming the four-layer diode 30 is not conducting. Accordingly, capacitor 33 charges with the polarity as indicated in the schematic diagram. Subsequently, when four-layer diode 30 is rendered conductive, the discharge of capacitor 26 provides current flow through resistance 31, making the potential at junction 32 more negative. This negative change of potential at junction 32 is reflected through capacitor 33, driving the anode of controlled rectifier 7 below ground potential, thereby commutating or turning off the controlled rectifier.

Controlled rectifier 7 is therefore part of a monostable multivibrator operative in response to trigger pulses applied to primary winding 24. It is seen that the trigger pulse renders the controlled rectifier conductive, which in turn causes capacitor 26 to begin charging. A predetermined time interval thereafter, the potential across capacitor 26 causes four-layer diode 30 to conduct, which in turn commutates the controlled rectifier. Therefore, in response to a trigger pulse applied to the controlled rectifier, the controlled rectifier remains conductive for a predetermined time interval. At any time when controlled rectifier 7 is conductive, current may flow from the positive source of potential through load devices 1–3, provided an associated transistor 4–6 is conductive.

It should be noted that the transistors 4–6 are each connected in AND circuit relationship with controlled rectifier 7. In other words, in order to provide a pulse of energy to any one of the load devices, it is necessary that both the associated transistor be rendered conductive and that a pulse be applied to the controlled rectifier 7. Also, the controlled rectifier may be considered as forming a pulse generating circuit, the pulses therefrom controlling the distribution of energizing pulses to those of the load devices appropriately conditioned for energization by their associated transistor.

While only one advantageous embodiment of the present invention has been illustrated in detail, it is obvious that numerous changes could be made without departing from the scope of this invention. The present invention is defined more specifically in the appended claims.

What is claimed is:

1. In a circuit for selectively energizing an inductive load; in combination with said load; a source of potential; a first and a second switching device connected in series relationship with said load across said source, said first device having a selected low inverse voltage rating and being employed, when operated to the conducting condition, only for conditioning said load for energization, said second switching device having a selected relatively high inverse voltage rating and being employed, when operated to the conducting or non-conducting condition, respectively to initiate or terminate, respectively, current flow through said load from said source; separate means for respectively operating said first switching device and said second switching device to the conducting or non-conducting condition, the selected relatively high inverse voltage rating of said second switching device being such as to enable that device to withstand the high inverse voltage generated by the collapse of the magnetic field of said load with the abrupt interruption of the supply voltage thereto when said second device is operated to the non-conducting condition to deenergize said load; and means for preventing the first switching device from being damaged by said high inverse voltage.

2. The combination of claim 1, in which the last-mentioned means is a means for causing said first switching device to be in the conducting condition to provide a low impedance path at the time of occurrence of said generated high inverse voltage, whereby said first switching device is unaffected by the magnitude of that voltage.

3. The circuit of claim 1, in which said first switching device is a transistor of the PNP semiconductor type having a base, emitter, and collector electrode, and circuits therefor, with the emitter-collector circuit connected in series with said load, which transistor is operated by its separate means to the conductive condition to condition said load for energization by the application to the base electrode of a potential negative with respect to the emitter electrode; and said second switching device is a controlled rectifier of the PNPN semiconductor type having a cathode, anode, and a gate electrode, and circuits therefor, with its cathode-anode circuit connected in series with said load and the emitter-collector circuit of said transistor across said source, said controlled rectifier being rendered conductive by operation of its separate means to cause energizating current to be supplied to said load by the application of a positive trigger pulse to the gate electrode, and is turned off to interrupt the supply of energizing current through said load by momentarily making the anode negative with respect to its cathode, said transistor being in the conducting condition forming a low impedance path when said controlled rectifier is turned off and when the generated high inverse voltage appears in said circuit.

4. In a switching circuit for selectively energizing one or more of a plurality of inductive loads, comprising in combination with said plurality of loads; a source of voltage; a plurality of first switching devices of selected low inverse voltage rating each having its switching path connected in series with a different one of said loads and being employed, when it is operated to the conducting condition, only for conditioning the associated load for energization; a common second switching device of relatively high inverse voltage rating having its switching path connected in series with each of said loads and its load-conditioning first switching device across said source; separate means for respectively operating said first and second switching device to the conducting or non-conducting condition, the selected relatively high inverse voltage rating of said common second switching device being such as to enable that device to withstand the high inverse voltage generated by the collapse of the magnetic field of the conditioned loads with the abrupt termination of the supply voltage thereto when, with both said common device and said conditioned first devices operated to the conducting condition, said common device is operated to the non-conducting condition to de-energize said conditioned loads.

5. The circuit of claim 4, in which each of said first switching devices is a transistor of the PNP semiconductor type having an emitter, collector, and base electrode with the emitter-collector path connected in series with a different one of said loads; and said common second switching device comprises a controlled rectifier of the PNPN semiconductor type having a cathode, an anode, and a gate electrode with the cathode-anode path connected in series with each of said loads and its load-conditioning transistor across said source; each transistor being operated by its separate means to the conducting condition to condition the associated load for energization by the application to its base electrode of a potential negative with respect to its emitter electrode; and said controlled rectifier being rendered conductive by its separate means to cause energizing current to be supplied to each of the conditioned loads by a positive trigger pulse applied to its gate electrode, and is turned off to interrupt the supply of energizing current to all the conditioned loads by momentarily making the anode thereof negative with respect to the cathode, said conditioned transistors being in the conducting condition so that each forms a low impedance path when said controlled rectifier is turned off and the generated high inverse voltage appears in the circuit.

6. The circuit of claim 5, in which said common second switching device is a controlled rectifier having a gate electrode, which rectifier is part of a pulse forming circuit which is rendered conductive for a predetermined time interval in response to a positive trigger pulse applied to the gate electrode of the rectifier to return it to the non-conducting condition, said pulse forming circuit after said interval being operative to commutate the controlled rectifier, said pulses being operative to control the distribution of energizing current to those of said loads which have been conditioned for energization at that time by the associated first switching devices.

References Cited by the Examiner

UNITED STATES PATENTS

| | | | |
|---|---|---|---|
| 2,432,787 | 12/1947 | Nichols | 234—108 |
| 2,848,653 | 8/1958 | Hussey | 307—88.5 |
| 2,887,619 | 5/1959 | Hussey et al. | 307—88.5 |
| 3,097,307 | 7/1963 | Bonn | 307—88.5 |
| 3,142,247 | 7/1964 | Sweeney | 317—148.5 |

OTHER REFERENCES

Publication: "A Survey of Some Circuit Applications of the Silicon Controlled Switch and Silicon Controlled Rectifier," Applications and Circuit Design Notes, Solid State Products, Inc., bulletin D420–02–12–59, pages 4, 5, 7, December 1959.

SAMUEL BERNSTEIN, *Primary Examiner.*